(12) United States Patent  
Morrison

(10) Patent No.: US 8,284,173 B2  
(45) Date of Patent: Oct. 9, 2012

(54) SYSTEM AND METHOD OF DETECTING CONTACT ON A DISPLAY

(75) Inventor: Gerald Morrison, Calgary (CA)

(73) Assignee: SMART Technologies ULC (CA)

( * ) Notice: Subject to any disclaimer, the term of this patent is extended or adjusted under 35 U.S.C. 154(b) by 0 days.

(21) Appl. No.: 13/346,229

(22) Filed: Jan. 9, 2012

(65) Prior Publication Data

US 2012/0105380 A1     May 3, 2012

Related U.S. Application Data

(63) Continuation of application No. 11/781,811, filed on Jul. 23, 2007, now Pat. No. 8,094,137.

(51) Int. Cl.  
*G06F 3/042* (2006.01)

(52) U.S. Cl. ...................................................... 345/175

(58) Field of Classification Search .................. 345/166, 345/173, 175; 250/221, 222.1; 348/211.7; 178/18.01  
See application file for complete search history.

(56) References Cited

U.S. PATENT DOCUMENTS 7,538,759 B2 * 5/2009 Newton ......................... 345/173

* cited by examiner

*Primary Examiner* — Abbas Abdulselam  
(74) *Attorney, Agent, or Firm* — Katten Muchin Rosenman LLP

(57) ABSTRACT

A system for detecting contact on a display is provided. The system comprises a planar medium associated with the display and includes at least one edge facet and opposing surfaces. The system also includes one or more optical sources operatively coupled to the at least one edge facet for transmitting an optical signal into the planar medium such that the transmitted optical signal is totally internally reflected between the at least one edge facet and opposing surfaces. An optical sensing device is positioned to substantially face at least a portion of the edge facet and adapted to detect at least one object contacting a first surface of the opposing surfaces. The optical sensing device is operative to detect a portion of the optical signal emitted from the first surface at a location corresponding to the object contacting the first surface.

73 Claims, 9 Drawing Sheets

SYSTEM AND METHOD OF DETECTING CONTACT ON A DISPLAY

This is a continuation of U.S. patent application Ser. No. 11/781,811, filed Jul. 23, 2007, now U.S. Pat. No. 8,094,137, issued Jan. 10, 2012 the contents of which are incorporated herein by reference.

FIELD OF THE INVENTION

The present invention relates generally to display screens, and in particular, to a system and method for detecting contact on such display screens.

BACKGROUND OF THE INVENTION

Touch systems are well known in the art and typically include a touch screen having a touch surface on which contacts are made using a pointer. Pointer contacts with the touch surface are detected and are used to generate corresponding output pointer position data representing areas of the touch surface where the pointer contacts are made. There are basically two general types of touch systems available and they can be broadly classified as "active" touch systems and "passive" touch systems.

Active touch systems allow a user to generate pointer position data by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate pointer position data by contacting the touch surface with a passive pointer and do not require the use of special pointers in order to activate the touch surface. A passive pointer can be a finger, a cylinder of some material, or any other suitable object that can be used to contact some predetermined area of interest on the touch surface. Since special active pointers are not necessary in passive touch systems, battery power levels and/or pointer damage, theft, or pointer misplacement are of no concern to users. The detection of one or more points of contact with the touch screen or other display surfaces may be accomplished by a myriad of techniques.

United States Patent Application No. 20060279558 to Van Delden et al. discloses a display device having a touch screen 301. The touch screen comprises a first light guide 302, a second light guide 307, and a media 309 between the light guides for eliminating interference and reflections. A light source 308 is arranged to emit light 310 into the first light guide 302, where the light is normally confined within the first light guide by means of total internal reflections. The second light guide 307 is arranged at the exterior face of the first light guide 302. When a user of the display device establishes physical contact with the touch screen 301, light is extracted from the first light guide and directed towards light detecting means 303. The light detecting means 303 are arranged for relating a light detecting event to an input position on the touch screen 301, where user interaction occurred.

United States Patent Application No. 20060114244 to Saxena et al. discloses a touch input system including a light-emitting device, a bent light guide, and a light detector, whereby the light-emitting device emits light. The bent light guide receives the light emitted by the light-emitting device and guides the light to travel in a direction across a face of a display screen, where light detector detects the light. When an object interrupts transmission of light, the interruption is detected by an activated light detector opposite the light emitter transmitting light. This is illustrated by an object 17 interrupting light transmitted from one of light emitters 10 to light detectors 11, and interrupting light transmitted from one of light emitters 12 to light detectors 14.

United States Patent Application No. 20050104860 to McCreary et al. discloses a touchframe system including a plurality of light emitting elements and a plurality of light receiving elements positioned around the perimeter of a display area. Each of the light receiving elements in combination with a plurality of the light emitting elements form a zone of light beam paths. The number and positioning of receivers is sufficient to form a plurality of partially overlapping zone pairs. These zone pairs are arranged relative to the display area such that any touch event lies within at least two zone pairs. A processor monitors each of the zone pairs for blockage of at least one light beam path. Upon such blockage, the processor calculates the location of the touch event associated with the blockage based on the slopes and end points of at least two intersecting blocked light beam paths from a first zone pair and two intersecting blocked light beam paths from a second zone pair.

United States Patent Application No. 20040032401 to Nakazawa et al. discloses a substrate made of glass that serves both as a substrate for a touch panel and a front light. The substrate includes both the function of propagating an ultrasonic wave in order to detect a touched position, and propagating light emitted from a light source to guide the light toward a reflective-type liquid crystal display. In the case where an image on the liquid crystal display is made visible by external light, the external light that is transmitted through the substrate is reflected by the liquid crystal display and transmitted through the substrate to be emitted from the front face. In the case where the front light function is used, light which has been introduced into the substrate from the light source is reflected by the liquid crystal display and transmitted through the substrate to be emitted from the front face.

U.S. Pat. No. 7,002,555 to Jacobsen et al. discloses a display device having a touch sensor that consists of an electrochromic cell or a liquid crystal cell that is located between two transparent plates, a transparent cover plate, and a transparent support plate. A radiation source whose light enters the cover plate and illuminates it is arranged on at least one of the end faces of the transparent cover plate. At least one photodetector is mounted on the support plate.

U.S. Pat. No. 6,738,051 to Boyd et al. discloses a frontlit touch panel for use with a reflective light valve, where the panel comprises a front light guide having at least one light input face that supplies light to the guide, a viewing face, a light output face opposite the viewing face, and at least one component of a touch-sensitive transducer. The light output face includes a light extraction layer thereon having a substantially flat light exit face and contains buried reflective facets that extract supplied light from the guide through the light exit face. The touch panel can be used with a light source, a reflective light valve, and suitable control electronics to form a compact and efficient illuminated touch panel display assembly.

U.S. Pat. No. 4,710,760 to Kasday discloses a touch-sensitive device comprising a photoelastic screen having light reflecting edges and a unique light emitting/receiving module placed at two of the four corners of the screen, which advantageously determines the location at which a force is applied to the screen. Circularly and linearly polarized light focused into the photoelastic screen by the modules reflects off the edges of the screen and is returned to the modules where it is absorbed by a circular polarizer. The polarization of light passing through a point at which the screen is touched is changed thereby allowing these rays or signals to pass through each module's absorber. The location as well as the magnitude and direction of the force imparted to the screen by the touch is then determined from the changes in the signals that pass through the absorber.

It is therefore at least one object of the present invention to provide a novel system and method of detecting contact on a display screen.

SUMMARY OF THE INVENTION

These and other objects may be accomplished according to one or more embodiments, whereby a system for detecting contact on a display is provided. The system for detecting contact comprises a planar medium associated with the display and includes at least one edge facet and opposing surfaces. The system also includes one or more optical sources operatively coupled to the edge facet for transmitting an optical signal into the planar medium such that the transmitted optical signal is totally internally reflected between the at least one edge facet and opposing surfaces. According to the system, an optical sensing device is positioned to substantially face at least a portion of the edge facet and adapted to detect at least one object contacting a first surface of the opposing surfaces. The optical sensing device is operative to detect a portion of the optical signal emitted from the first surface at a location corresponding to the object contacting the first surface.

According to another embodiment, a system for detecting contact on a display is provided, where the system comprises a planar medium associated with the display and includes at least one edge facet and opposing surfaces. The system also includes one or more optical sources operatively coupled to the edge facet for transmitting an optical signal into the planar medium such that the transmitted optical signal is totally internally reflected between the at least one edge facet and opposing surfaces. Further, according to the system, at least two camera devices are provided, where the camera devices are positioned to substantially face at least a portion of the edge facet and adapted to detect at least one object contacting a first surface of the opposing surfaces. The camera devices are operative to capture images of a portion of the optical signal emitted from the first surface at a location corresponding to the object contacting the first surface.

According to yet another embodiment, a method of detecting contact to a display is provided. The method of detecting contact to a display comprises transmitting an optical signal into a planar medium associated with the display, where within the planar medium the transmitted optical signal is totally internally reflected. An optical sensing device is positioned to substantially face a side location associated with the planar medium and a surface location on the first surface is contacted using at least one object. Using the optical sensing device, a portion of the optical signal emitted from the surface location is detected based on the object contacting the surface location.

Further, according to an embodiment, a method of detecting contact to a display is provided, where the method comprises transmitting an optical signal into a planar medium associated with the display, where within the planar medium the transmitted optical signal is totally internally reflected. The method also includes positioning a first camera device to substantially face a first side location associated with the planar medium, where the first camera device receives images from a first surface of the planar medium. A second camera device is positioned to substantially face a second side location associated with the planar medium, where the second camera device receives images from the first surface of the planar medium. A surface location on the first surface is contacted using at least one object, whereby using the first and second camera, images of a portion of the optical signal emitted from the surface location based on the object contacting the surface location are captured.

Also, in another embodiment, a passive touch system comprises a touch screen having opposing surfaces that are adapted to receive an optical signal that is totally internally reflected within the opposing surfaces. Upon an object contacting a surface location associated with the opposing surfaces, a portion of the optical signal is emitted from the surface location. At least two cameras are associated with the touch surface and positioned substantially at a side location to the touch surface. At the surface location, images of the portion of the optical signal emitted from the surface location are captured by the two cameras for determining a coordinate position associated with the object contacting the surface location.

BRIEF DESCRIPTION OF THE DRAWINGS

One or more embodiments will now be described more fully with reference to the accompanying drawings in which.

DETAILED DESCRIPTION OF THE PREFERRED EMBODIMENT

In the following description, an embodiment of a system and method for detecting contact from, for example, a user's finger, a cylindrical hand-held object, or any other capable means on a display screen such as a touch screen used in media presentation systems is provided.

Figure 1A:
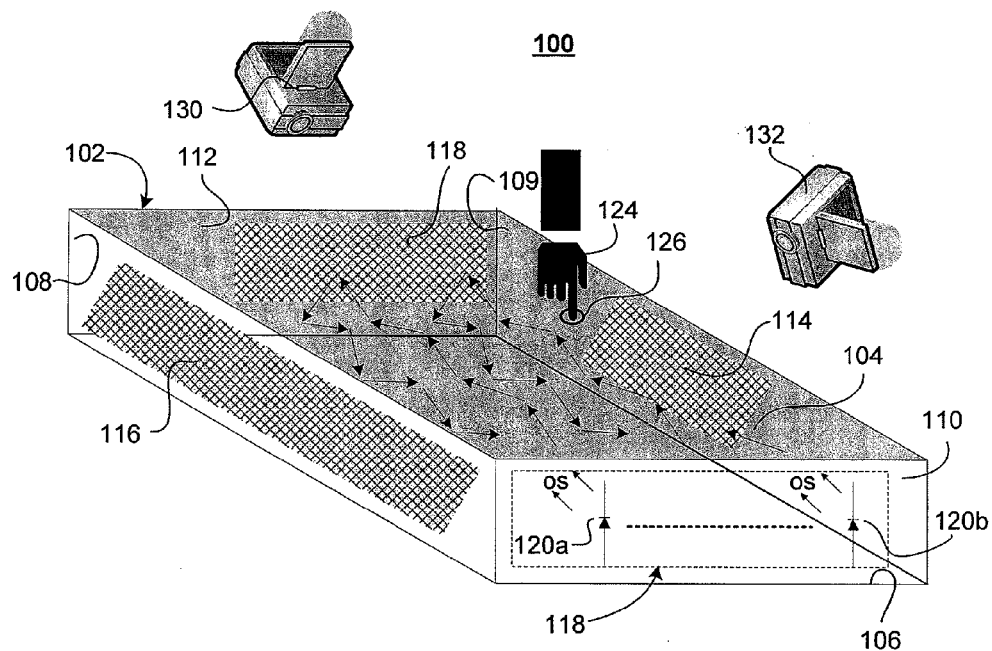
FIG. 1A is a system for detecting contact on a display according to one embodiment.

Turning now to FIG. 1A, a system 100 for detecting contact on a display includes a planar shaped medium 102, an optical source 118, and at least one optical sensing device such as camera devices 130 and 132.

The planar shaped medium 102 may be adapted to conform to the shape of a display screen (not shown) or alternatively form an integral part of the outer-surface of a display screen. In either aspect, the planar shaped medium 102 is utilized to receive contact directly (e.g., via a finger) or indirectly (e.g., via a pen-shaped or any other object) from a user. Planar shaped medium 102 includes opposing surfaces such as top-surface 104 and bottom-surface 106. The planar shaped medium 102 also includes peripheral edge facets such as opposing edge facets 108 and 109, and opposing edge facets 110 and 112. The outer surfaces of opposing edge facets 108 and 109 and edge facet 112 are covered with an optically reflective material such as copper or silver tape. Alternatively, reflective materials may be deposited directly onto the outer surfaces of the side opposing facets 108, 109 and end facet 112 using known deposition, adhesion, or bonding techniques. As illustrated, edge facet 108 includes reflective surface 116, edge facet 109 includes reflective surface 114, and edge facet 112 includes reflective surface 118.

Edge facet 110 is adapted to receive an optical signal from the optical source 118, whereby the optical source 118 may be coupled either directly to the edge facet 110 using a surface mountable optical device (e.g., surface emitting light emitting diodes) or via an intermediate optical mechanism (e.g., an optical fiber, a lens assembly, optical filters, an optical diffuser, etc.). The planar shaped medium 102 is constructed from a material capable of exhibiting optical wave-guiding properties such as an acrylic material having fire polished edges. Other materials such as glass may also be used to form planar shaped medium 102. Although optical source 118 is coupled to edge facet 110, other optical sources (not shown) may also be adapted to transmit optical signals into the planar shaped medium 102 via one more of the other facets. For example, additional optical sources (not shown) may be coupled to facets 108, 109, and/or 112. The addition of other optical sources (not shown) reduces the reflectivity requirements exhibited by reflective surfaces 114, 116, and 118. For example, when an optical source is coupled to each of facets 108, 109, 110, and 112, the incorporation of reflective surfaces on the facets is no longer a necessity and may be optional. According to another example, optical sources may each be coupled to facets 110 and 108. In such an embodiment, edge facets 112 and 109 may include reflective surfaces that reflect any optical signals transmitted from the optical sources that are coupled to facets 110 and 108, respectively.

Optical source 118 may include one or more spatially distributed light emitting diodes such LED device 120a and LED device 120b. Light emitting diodes 120a-120b may include a viewing half angle in the range of 0-90 degrees. The number of utilized LED devices may depend on the required optical power relative to the spatial distribution of the incident optical signal transmitted into the planar shaped medium 102. These factors may in turn depend on the geometric size of the planar shaped medium 102 and the attenuation properties of the material forming the planar shaped medium 102. For example, glass may exhibit less attenuation on a transmitted optical signal relative to plastic. Other optical sources such as one or more laser devices (e.g., FP laser diodes, DFB laser diodes, VCSEL devices, etc.) may also be used for transmitting optical signals into planar shaped medium 102.

The optical output signals provided by optical source 118 may include a wide range of wavelengths such as infrared, visible light, as well as ultraviolet. For example, the use of certain visible wavelengths may create various visual effects with respect to a planar shaped medium incorporated as a display screen. In one scenario, for example, multiple presentation screens may be set-up during a conference. The different presentation screens may then be color coded by transmitting different visible light signals into each display screen (i.e., via the planar medium) using different wavelength optical sources (e.g., red LED, blue LED, etc.). In another scenario, for example, no visual effect may be desired. Accordingly, an optical source operating in the infrared range is employed for signal transmission into the planar shaped medium 102.

According to one aspect, optical sensing devices such as camera devices 130 and 132 may include CMOS based camera sensors, which allow for the processing of a subset of available pixels as opposed to the collection of every pixel. This reduces the processing overhead while increasing the frame rate (fps) capabilities. Each of the camera devices 130, 132 is positioned to substantially face one of the edge facets and adapted to capture images of an object 124 (e.g., a user's finger) contacting a location 126 on the top-surface of the planar shaped medium 102. For example, camera 132 may be positioned to fully or partially face edge facet 109, while capturing images from top-surface 104. Similarly, camera 130 may be positioned to fully or partially face opposing edge facet 112, while also capturing images from top-surface 104. In an alternative example, camera 132 may be positioned to fully or partially face opposing edge facet 108, while capturing images from top-surface 104. The field of view of cameras 130 and 132 overlap and cover the top-surface 104 of the planar medium 102 in order to facilitate both the detection and position determination of an applied contact location on the top-surface 104. According to another aspect, the optical sensing device may include a photodetector device (not shown) such as a photodiode. As with the camera devices 130, 132, the photodetector may also be positioned to substantially face one of the opposing edge facets and adapted to detect the object 124 (e.g., a user's finger) contacting a region such as location 126 on the top-surface of the planar shaped medium 102.

Figure 1B:
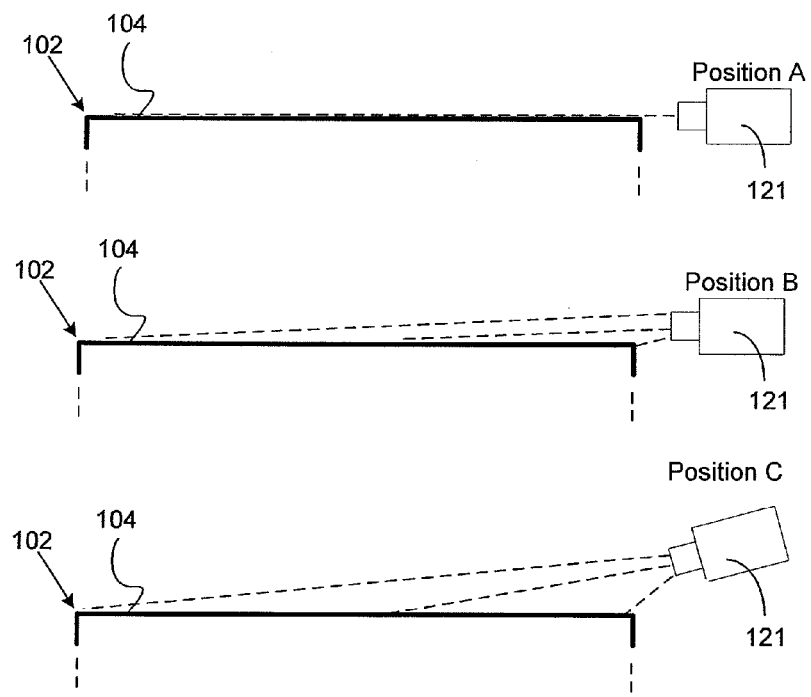
FIG. 1B is a cross-sectional view illustrating the position of an optical sensing device relative to the surface of a planar shaped medium associated with the embodiment of FIG. 1A.
Figure 6:
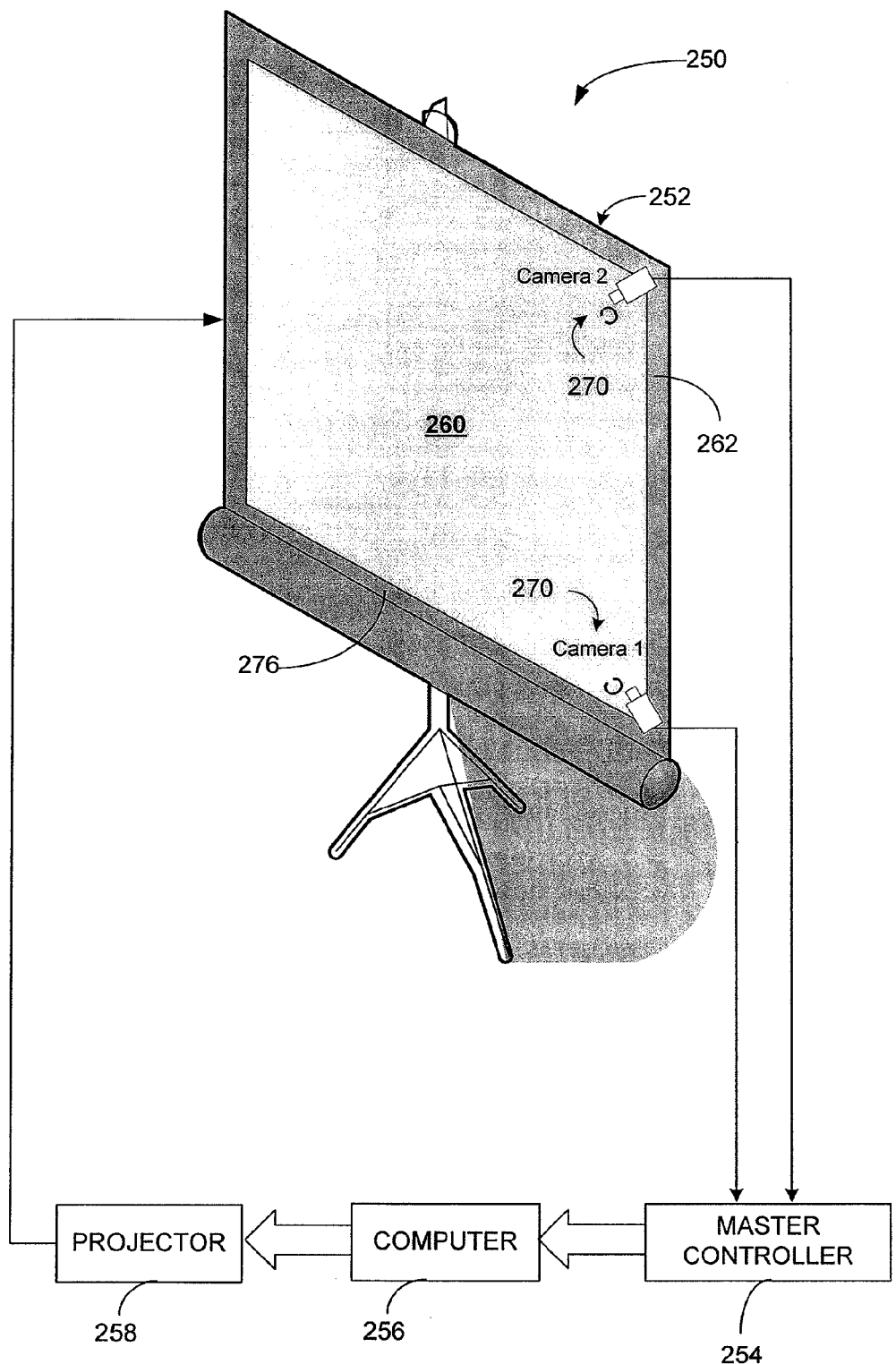
FIG. 6 is a schematic diagram of a camera-based touch system adapted to incorporate the system of FIG. 1A.
Figure 7:
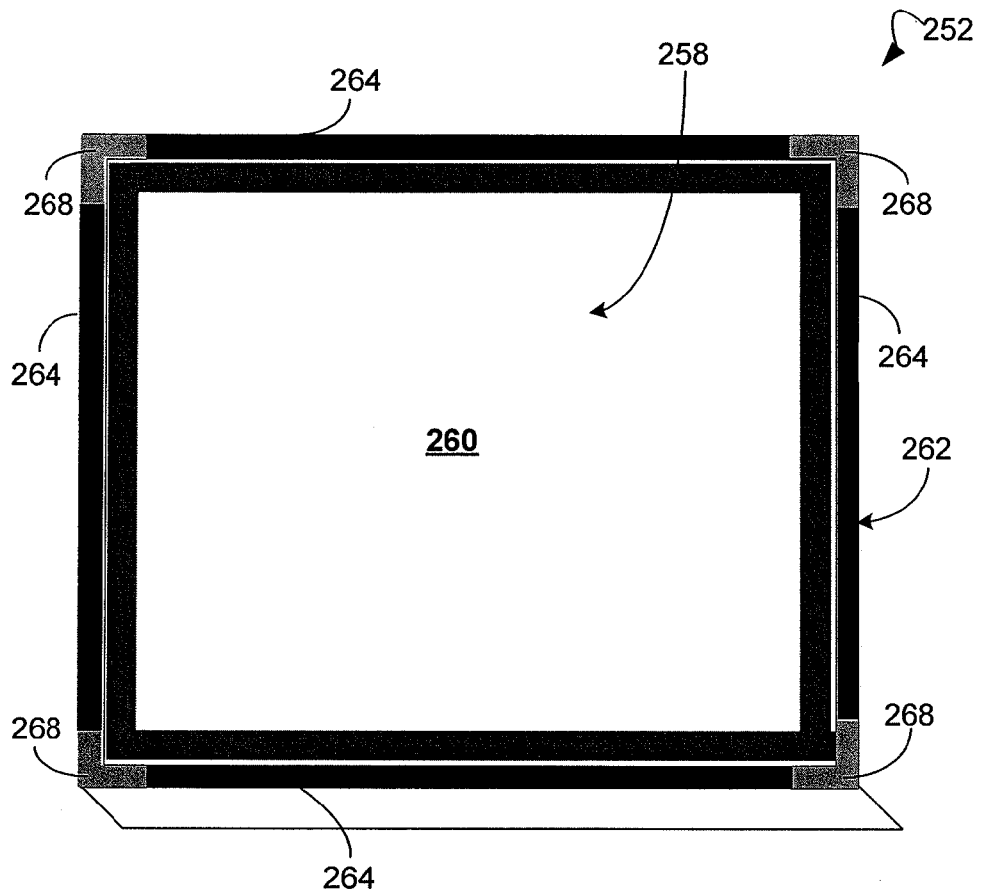
FIG. 7 is a front elevation view of a touch screen forming part of the touch system of FIG. 6.

The position of cameras 130 and 132 relative to top-surface 104 are arranged in a manner that enables the capture of images from the top-surface 104. As illustrated in FIG. 1B, an optical sensing device 121 such as one or more camera devices or photodetectors may be positioned according to a multitude of positions while still capturing the images from top-surface 104. For example, the "position A" device 121 is positioned (i.e., relative to an axis going through the center of a camera lens or photodetector photosensitive area) to be substantially aligned with the top-surface 104 of planar medium 102. The "position B" and "position C" devices 121 are positioned (i.e., relative to an axis going through the center of a camera lens or photodetector photosensitive area) to be substantially elevated relative to the top-surface 104 of planar medium 102. In both cases, however, the device 121 is capturing images from the side of the planar medium 102. Since the planar medium 102 may, for example, form the outer surface of a display such as a plasma or LCD screen, the side-looking positioning of the device 121 does not interfere or obstruct any projection means used by the plasma or LCD technology in generating images on the corresponding plasma or LCD displays. For example, as illustrated in FIGS. 6 and 7, camera devices 270 (FIG. 6) may be installed in one of the corners 268 of display frame 262. Alternatively, for example the cameras 270 may be positioned along any portion of the frame between corners 268.

Figure 2A:
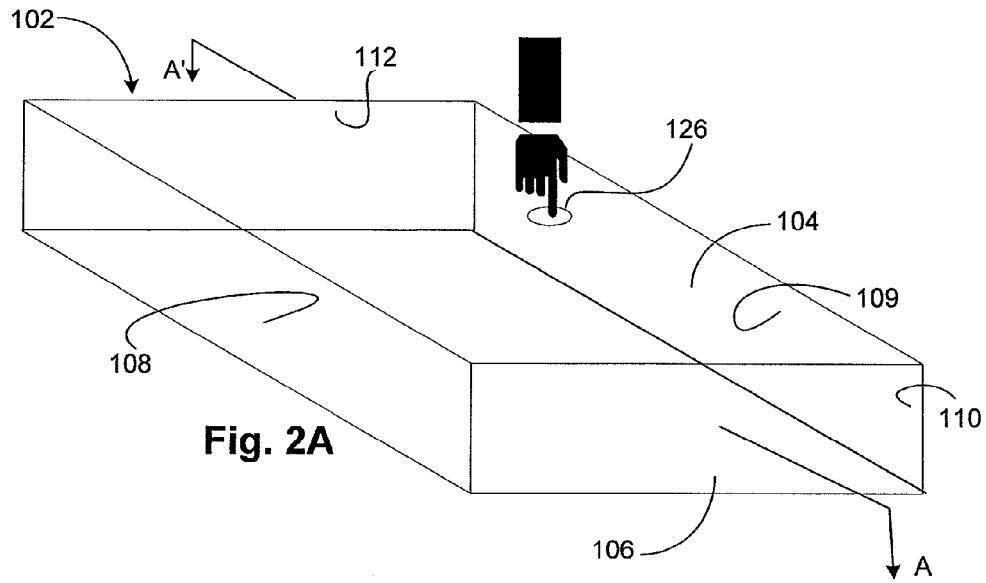
FIGS. 2A-2C illustrate the concept of detecting contact to a planar shaped medium according to the embodiment of FIG. 1A.
Figure 2B:
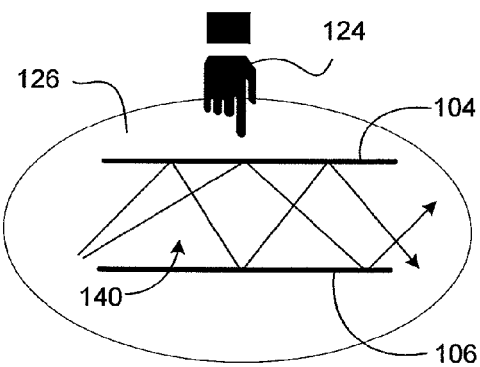
Figure 2C:
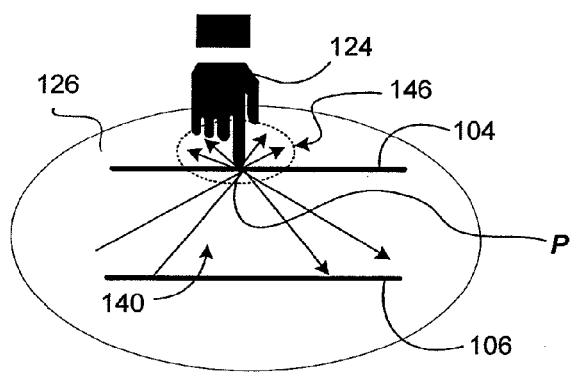

Turning now to FIGS. 2A-2C, the concept of detecting contact to a display according to an embodiment such as the embodiment of system 100 (FIG. 1A) is illustrated. As illustrated in FIG. 2A, a user may apply contact to a location 126 on the top-surface 104 of the planar shaped medium 102. The effect of such a contact is now illustrated with the aid of FIGS. 2B and 2C. FIGS. 2B and 2C show a cross-sectional view along axis A-A' of a region 126 of the planar shaped medium 102 of FIG. 2A. Referring to FIG. 2B, an optical signal 140 generated from source 118 (FIG. 1A) is totally internally reflected between opposing surfaces 104 and 106, and the peripheral edge facets 108, 109, 112 (FIG. 2A). Referring to FIG. 2C, as a user 124 applies a contact to top-surface 104, a portion 146 of the optical signal 140 that is totally internally reflected between the opposing surfaces 104,106 and peripheral edge facets 108, 109, 112 (FIG. 2A) is emitted from the top-surface. Based on the user applying the contact to the top-surface, a refractive index change is generated at the point of contact P, which causes the totally reflected optical signal 140 to be frustrated at the contact point P. Thus, the Frustrated Total Internal Reflection (FTIR) phenomenon at the boundary between the point of contact and the top-surface 104 facilitates the detection of the portion 146 of the internally reflected optical signal 140 emitted from the top-surface 104 by any suitable optical sensing device such as a cameras or optical sensing device that is directed at the top-surface 104 of the planar shaped medium 102 (FIG. 2A).

The use of a suitable optical sensing device may depend on the application of the system and methods described herein. For example, the use of one or more cameras provides the capability of both detecting the point or points of contact with the top-surface 104 and locating the position of the point of contact with the top-surface 104 using further image processing techniques. Alternatively, for example, a photodetector device may be utilized to detect the presence of the emitted portion of light 146, therefore, signifying that contact with the top-surface 104 has been made.

Figure 3A:
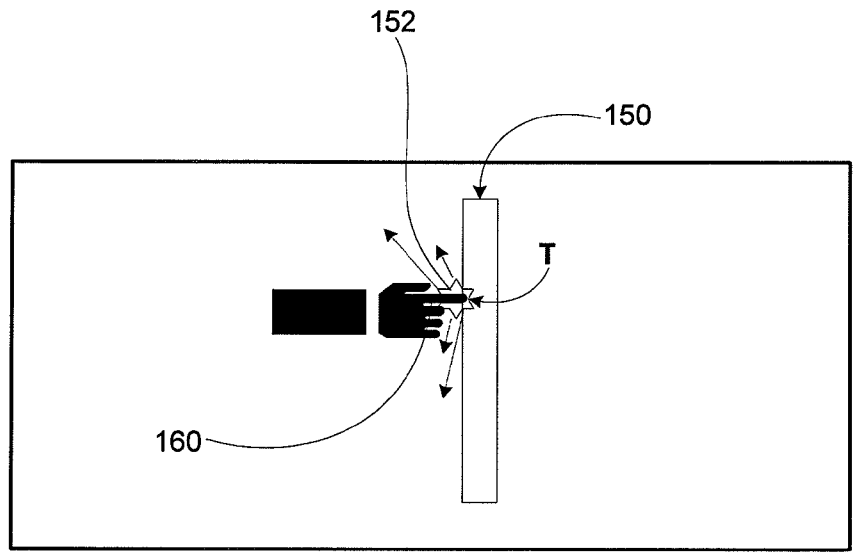
FIGS. 3A-3B are photographic illustrations of contact detection on a planar shaped medium constituting a display.
Figure 3B:
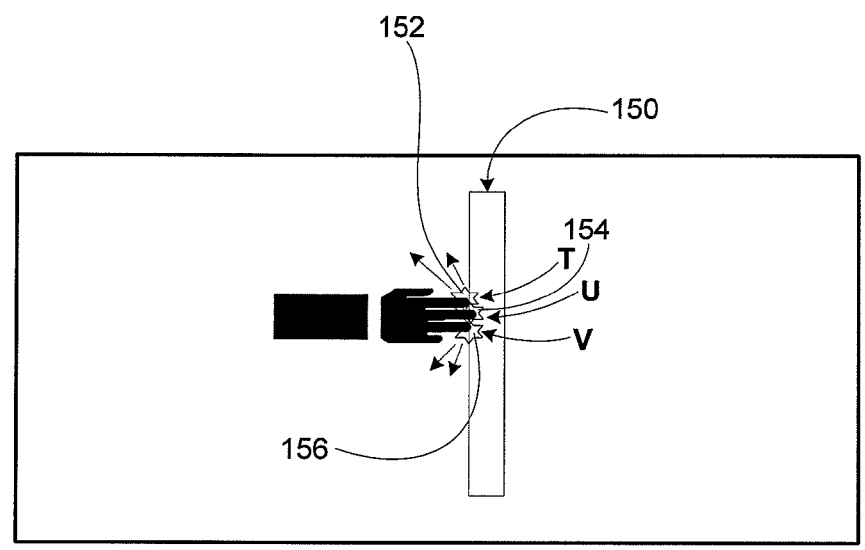

Referring now to FIGS. 3A and 3B, photographic illustrations of captured images by a camera device of points of contact with a top-surface of a screen 150 are illustrated. In FIG. 3A, a user's finger 160 is used to contact the top-surface of the screen 150 incorporating a similar embodiment to that of system 100 (FIG. 1A). As illustrated, an emitted frustrated optical signal manifested as an illuminated region 152 is captured by the camera device at the point of contact T. Similarly, as depicted in FIG. 3B, the camera captures a user's fingers applying multiple contact points to the top-surface 150 and thus causing the emission of multiple frustrated optical signals manifested as illuminated regions 152, 154, 156 at contact points T, U, and V, respectively.

Figure 4:
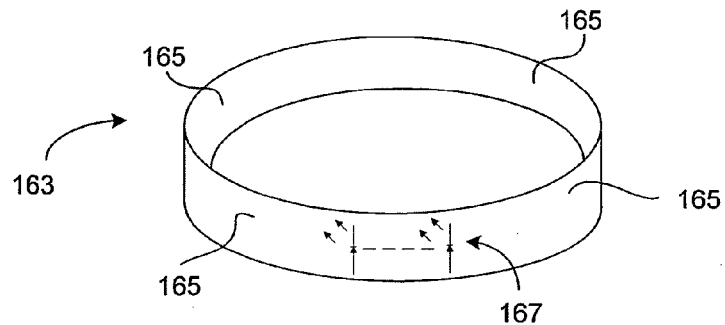
FIG. 4 illustrates an alternative embodiment of a planar shaped medium associated with the described system.

Turning now to FIG. 4, an alternative embodiment of a planar shaped medium 163 is illustrated. As shown in FIG. 1A, the planar shaped medium 102 is rectangular shaped and therefore includes four flat-faced edge facets. In the alternative embodiment shown in FIG. 4, a planar shaped medium 163 having a single edge facet 165 is provided by utilizing an elliptical or circular shaped planar medium. The surfaces of edge facet 165 may be partially or completely covered by an optically reflective material for facilitating the reflectivity of an optical signal transmitted by optical source 167 into the planar shaped medium 163.

Figure 5A:
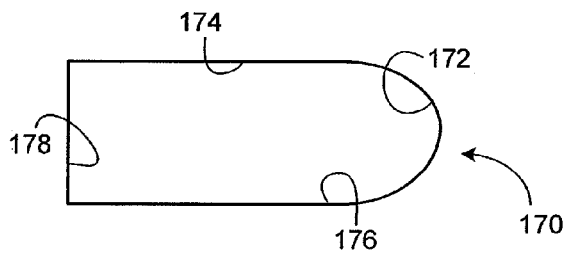
FIGS. 5A-5C illustrate other alternative embodiments of a planar shaped medium associated with described system.
Figure 5B:
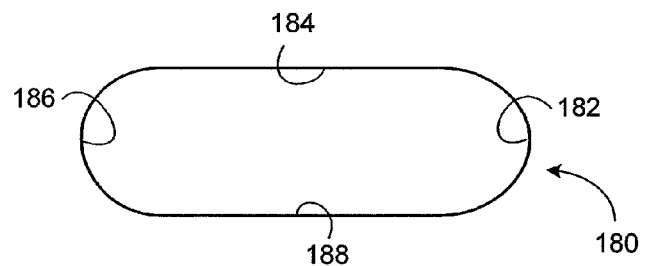
Figure 5C:
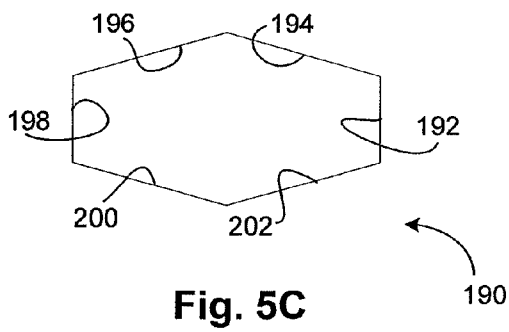

Other shaped planar media may also be utilized within system 100 (FIG. 1A), as depicted in FIGS. 5A-5C. Referring to FIG. 5A, planar shaped medium 170 includes flat faced edge facets 174, 176, 178 and a curve shaped edge facet 172. One or more optical sources may be coupled to any one or more of edge facets 172-178. Moreover, any one of the surfaces of edge facets 172-178 may be covered by an optically reflective surface. In FIG. 5B, planar shaped medium 180 includes opposing flat faced edge facets 184, 188 and opposing curve shaped edge facets 182, 186. One or more optical sources may be coupled to any one or more of edge facets 182-188. Also, any one of the surfaces of edge facets 182-188 may be covered by an optically reflective surface. Turning now to FIG. 5C, planar shaped medium 190 includes multi-sided flat faced edge facets 192-202, where one or more optical sources may be coupled to any one or more of the multi-sided flat faced edge facets 192-202. Any one of the surfaces of multi-sided flat faced edge facets 172-178 may also be covered by an optically reflective surface. As previously described in relation to FIG. 1A, the outer surfaces of the edge facets associated with FIGS. 4 and 5A-5C may be covered with an optically reflective material such as copper or silver tape. Alternatively, reflective materials may be deposited directly onto these outer surfaces using known deposition, adhesion, or bonding techniques.

The exemplary embodiments described in relation to FIGS. 4 and 5A-5C illustrate that a multitude of shapes may be adopted as a planar shaped medium. The allocation of a particular shape to a planar shaped medium may depend on, but is not limited to, aesthetic considerations, the shape of a display screen to which the planar shaped medium may be coupled to, the required size of the planar shaped medium, reflectivity considerations, optical source considerations, and other factors.

The foregoing embodiment for detecting contact on a planar shaped medium such as a display screen will now be explained in association with an exemplary media presentation system. Turning now to FIG. 6, an exemplary media presentation system such as camera-based touch system 250 is provided, as disclosed in U.S. Pat. No. 6,803,906 to Morrison et al. and assigned to the assignee of the subject application, the content of which is incorporated by reference herein in its entirety.

As illustrated in FIG. 6, a passive touch system 250 includes a touch screen 252 coupled to a master controller 254, whereby the master controller 254 is also coupled to a computer 256. Computer 256 executes one or more application programs and generates a display that is projected onto the touch screen 252 via a projector 258. The touch screen 252, master controller 254, computer 256 and projector 258 form a closed-loop so that user-contacts with the touch screen 252 can be recorded as writing or drawing, or used to control execution of application programs executed by the computer 256.

FIG. 7 better illustrates the touch screen 252. As shown in FIG. 6, touch screen 252 includes a touch surface 260 bordered by a frame 262. Touch surface 260 is passive and is in the form of a rectangular planar sheet of material such as the planar shaped medium 102 (FIG. 1A) described above. Referring to FIG. 7, each camera subsystem includes a camera system (not shown) mounted adjacent a different corner 268 of the touch screen 252 by a frame assembly 264. Each frame assembly 264 may include an angled support plate (not shown) on which the camera system is mounted.

Figure 8:
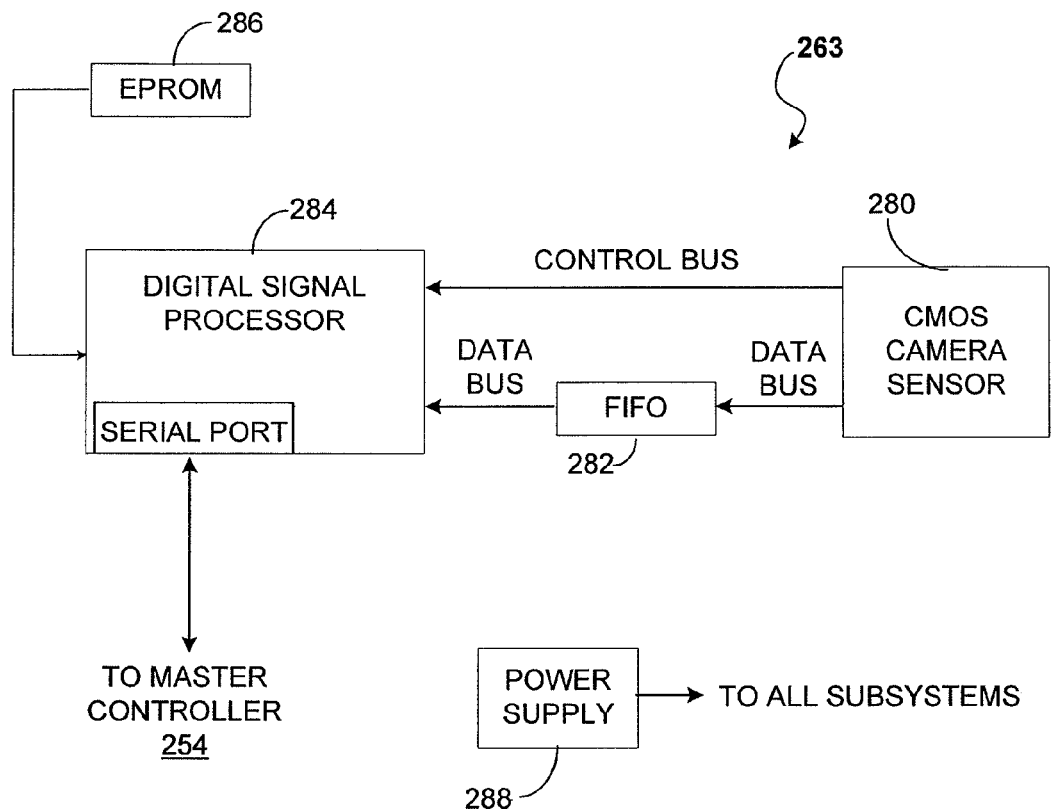
FIG. 8 is a schematic diagram of a camera system forming part of the touch system of FIG. 6.

Referring to FIG. 8, each camera system 263 may include a two-dimensional CMOS camera image sensor and associated lens assembly 280, a first-in-first-out (FIFO) buffer 282 coupled to the image sensor and lens assembly 280 by a data bus, and a digital signal processor (DSP) 284 coupled to the FIFO 282 by a data bus and to the image sensor and lens assembly 280 by a control bus. A boot EPROM 286 and a power supply subsystem 288 are also included.

The CMOS camera image sensor may include is a Photobit PB300 image sensor configured for a 20×640 pixel sub-array that can be operated to capture image frames at rates in excess of 200 frames per second. For example, the FIFO buffer 282 and DSP 284 may both be manufactured by Cypress under part number CY7C4211V and Analog Devices under part number ADSP2185M, respectively.

The DSP 284 provides control information to the image sensor and lens assembly 280 via the control bus. The control information allows the DSP 284 to control parameters of the image sensor and lens assembly 280 such as exposure, gain, array configuration, reset and initialization. The DSP 284 also provides clock signals to the image sensor and lens assembly 280 to control the frame rate of the image sensor and lens assembly 280.

Figure 9:
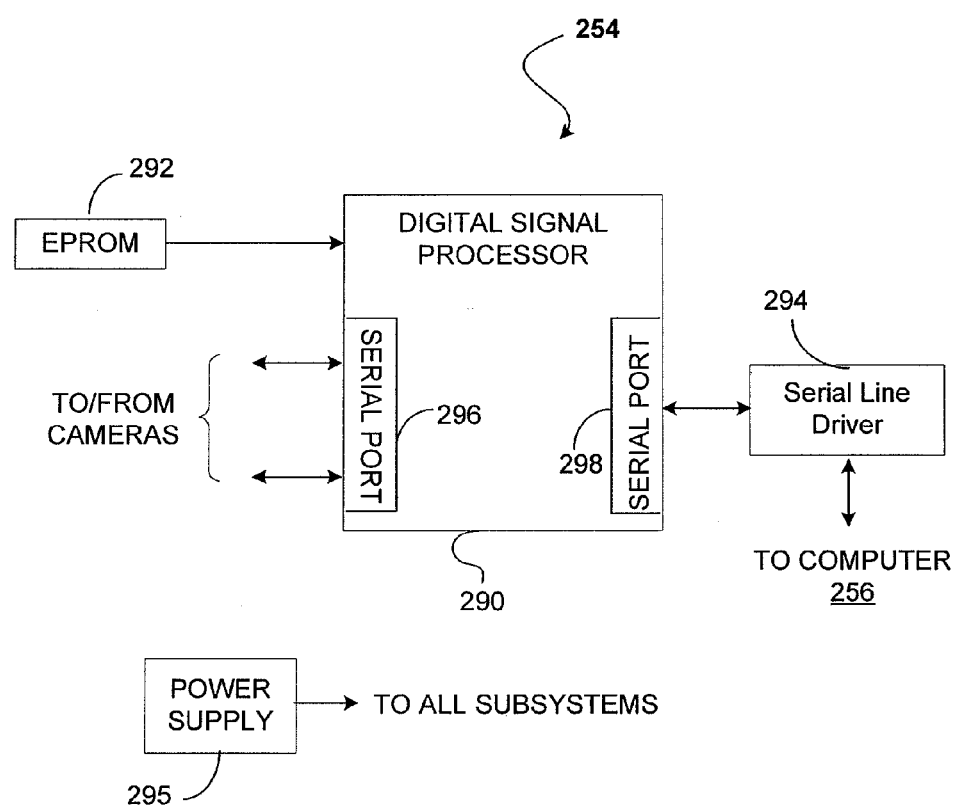
FIG. 9 is a schematic diagram of a master controller forming part of the touch system of FIG. 6.

As illustrated in FIG. 9, master controller 254 includes a DSP 290, a boot EPROM 292, a serial line driver 294 and a power supply subsystem 295. The DSP 290 communicates with the DSPs 284 of each of the camera systems 263 over a data bus and via a serial port 296. The DSP 290 also communicates with the computer 256 via a data bus, a serial port 298, and the serial line driver 294. In this embodiment, the DSP 290 is also manufactured by Analog Devices under part number ADSP2185M. The serial line driver 294 is manufactured by Analog Devices under part number ADM222.

The master controller 254 and each camera system 263 follow a communication protocol that enables bi-directional communications via a common serial cable similar to a universal serial bus (USB). The transmission bandwidth is divided into thirty-two (32) 16-bit channels. Of the thirty-two channels, five (5) channels are assigned to each of the DSPs 284 in the camera system 263 and to the DSP 290 in the master controller 254. The remaining seven (7) channels are unused. The master controller 254 monitors the twenty (20) channels assigned to the camera system DSPs 284 while the DSPs 284 in each of the camera systems 263 monitor the five (5) channels assigned to the master controller DSP 290. Communications between the master controller 254 and each of the camera systems 263 are performed as background processes in response to interrupts.

The general operation of the passive touch system 250 will now be described in association with system 100 (FIG. 1A), whereby the planar shaped medium 102 (FIG. 1A) forms the touch screen 260. In this embodiment, it is possible to superimpose the planar shaped medium 102 onto the existing touch screen 260 and therefore adapt system 100 for use with passive touch system 250. Alternatively, the planar shaped medium 102 may form an integral part of the touch screen 260 such that system 100 is an integral part of the passive touch system 250.

Each camera system 263 acquires images of the touch surface 260 within the field of view of its image sensor and lens assembly 280 at the frame rate established by the DSP clock signals and processes the images to determine if a pointer is in the acquired images. If a pointer is in the acquired images, the images are further processed to determine characteristics of the pointer contacting or hovering above the touch surface 260. The contacting of the pointer with touch surface 260 is detected by the camera as one or more illuminated regions that are created by frustrated optical signals that are emitted at the point of contact of the pointer with the touch surface 260. Pixel information associated with the one or more illuminated regions received is captured by the image sensor and lens assembly 280 and then processed by the camera DSPs 284. Pointer characteristics corresponding to pointer contact with the touch surface are converted into pointer information packets (PIPs) and the PIPs are queued for transmission to the master controller 254. Each of the camera systems 263 also receive and respond to diagnostic PIPs generated by the master controller 254.

The master controller 254 polls each of the camera system 263 at a set frequency (in this embodiment 70 times per second) for PIPs and triangulates pointer characteristics (e.g., pointer contact) in the PIPs to determine pointer position data. The master controller 254 in turn transmits pointer position data and/or status information to the personal computer 256. In this manner, the pointer position data transmitted to the personal computer 256 can be recorded as writing (e.g., annotations), drawing, executing a response, or can be used to control execution of application programs executed by the computer 256. The computer 256 also updates the display output conveyed to the projector 258 so that information projected onto the touch surface 260 reflects the pointer activity.

Figure 10:
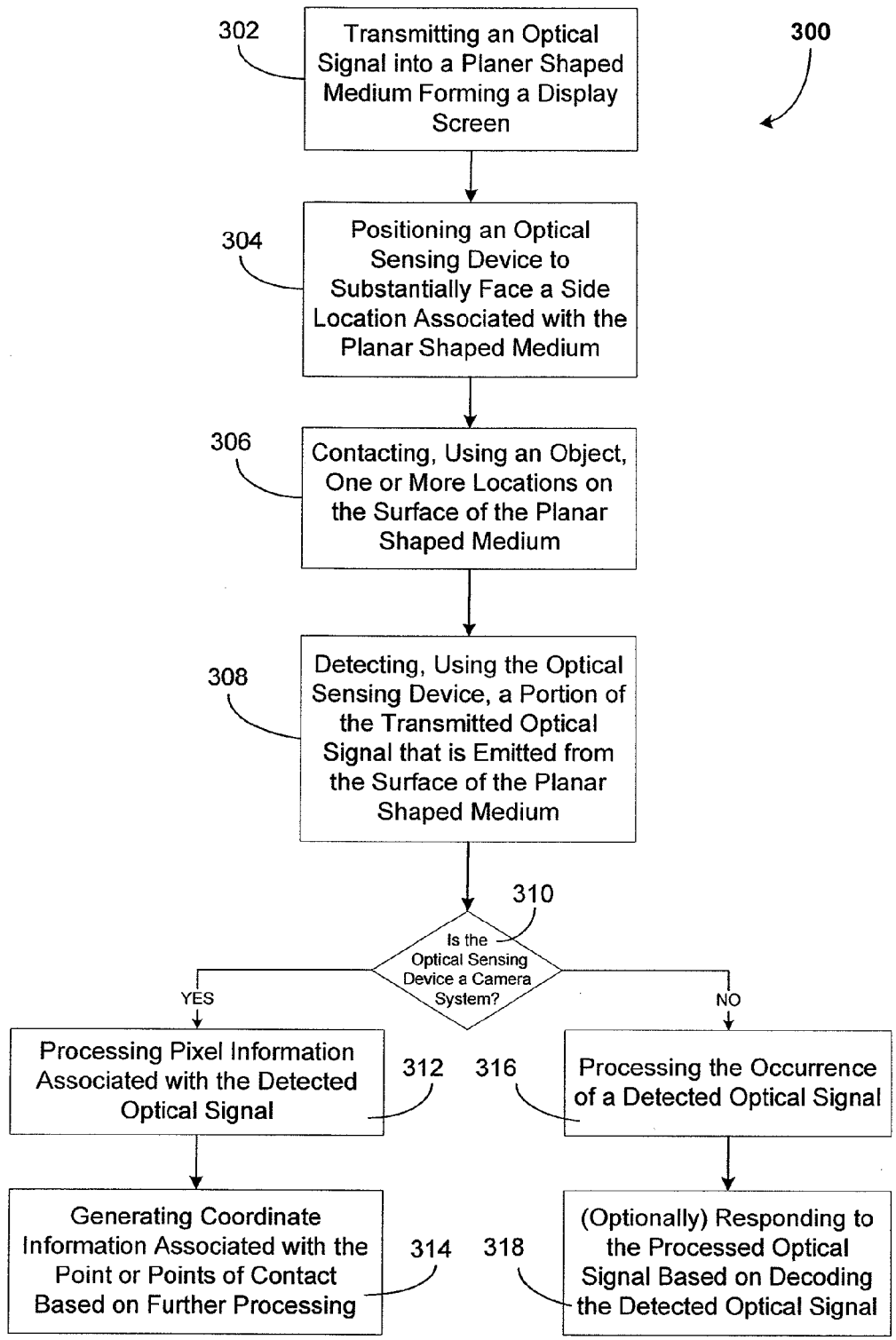
FIG. 10 is a flow diagram illustrating the operation of the embodiment of FIG. 1A.

The operation of system 100 (FIG. 1A) is now described with the aid of flow diagram 300 illustrated in FIG. 10. At step 302 an optical signal is transmitted into planar shaped medium 102 (FIG. 1A), where the planar shaped medium may form a display portion of a media presentation system such as passive touch system 250 (FIG. 6). The optical signal is totally internally reflected within the planar shaped medium 102.

At step 304, an optical sensing device such as one or more optical detectors and/or one or more camera devices 130, 132 (FIG. 1A) is positioned to substantially face a side location of the planar shaped medium and adapted to receive optical signals from the top-surface 104 (FIG. 1A) of the planar shaped medium 102. The side location of the planar shaped medium is generally the area or region surrounding the periphery such as edge facets 108, 109, 110, and 112 (FIG. 1A). For example, if other shaped planar media such as those illustrated and described in association with FIGS. 4 & 5 are utilized, the side location of the planar shaped media would generally be the area or region surrounding their edge periphery such as any one of the edge facets.

At step 306, once an object such as a user's finger or other pointer device contacts the top-surface of the planar shaped medium 102, a portion of the optical signal that is totally internally reflected within the planar medium 102 is emitted from the contact location based on the change in refractive index introduced by the contacting object. The magnitude of emitted light may depend on the surface pressure applied by the object at the contact location and the material used to apply the contact. For example, an increased pressure by the object at the contact location may increase the magnitude of optical signal emitted from the contact location. Also, the use of different materials to apply the contact may increase or decrease the amount of emitted optical signal.

At step 308, once the portion of the optical signal is emitted from the top-surface 104 based on the applied contact (step 306), the positioned optical sensing device (step 304) receives the emitted optical signal. In order to increase the detection capabilities of the optical sensing device with respect to background optical reflections, ambient light changes, or any other factors that may create a false indication of a detected optical signal, the optical source 118 (FIG. 1A) that transmits the optical signal into the planar medium 102 may be modulated and/or encoded using known techniques. By modulating and/or encoding the transmitted optical signal, the received emitted optical signal will also be modulated and/or encoded. Upon reception and processing, the modulated and/or encoded emitted optical signal facilitates distinguishing an actual emitted optical signal from spurious optical signals or intensity level changes and, therefore increases the signal-to-noise ratio of the system 100 (FIG. 1A). For example, the optical source may be encoded with a binary sequence using ON/OFF keying (OOK). The optical signal may also be intensity modulated, frequency modulated, or phase modulated. In another example, the optical source may be encoded or modulated using a Pseudo Random Binary Sequence (PRBS) generator.

If at step 310 it is determined that the optical sensing device is a camera device such as devices 130 and 132 (FIG. 1A), camera pixel information associated with the detected optical signal emitted from the planar medium 102 is captured and processed by a processor device such as the camera DSPs 284 (FIG. 8). Pointer information packets (PIPs) associated with the object contacting the location on the planar medium 102 are generated by and sent from the camera DSPs 284 to the DSP 290 or second processor device within master controller 254 (step 312). At the master controller 254, triangulation techniques may be used in conjunction with the PIPs received from the camera devices 130, 132 in order to generate coordinate information associated with the location or point(s) of contact of the object with top-surface 104 (step 314).

If at step 310 it is determined that the optical sensing device is one or more photodetectors, the detected signal associated with the emitted optical signal may be processed in order to decode the detected signal (step 316). For example, if a user contacts the top-surface 104 a few times in succession, the resultant successive detection of an increased optical intensity by the photodetector may, for example, be processed by the master controller 254 (step 316). Responsive to this processing, one or more predetermined events such as launching an application program on computer 256 (FIG. 6) may be initiated (step 318). Thus, by encoding the contacting, various events or processes may be identified and executed.

Other characteristics of the optical signal emitted from the top-surface 104 may be detected and decoded in response to the application of one or more contacts to the top-surface 104. For example, changes in the intensity of the emitted optical signal as a function of the applied pressure to a top-surface location by the object 124 (FIG. 1A), the simultaneous application of a plurality of objects (e.g., two, three, or more of the use's fingers) to the top-surface 104, and/or the successive application of contact (e.g., two or more taps) to one or more locations on the top-surface 104 may be decoded for initiating a predetermined response.

Although preferred embodiments of the present invention have been described, those of skill in the art will appreciate that variations and modifications may be made without departing from the spirit and scope thereof as defined by the appended claims.

What is claimed is:

1. A system for detecting contact on a surface, the system comprising:
   a planar medium including at least one edge facet and opposing surfaces;
   at least one optical source operatively coupled to the at least one edge facet for transmitting an optical signal into the planar medium such that the transmitted optical signal is totally internally reflected between the at least one edge facet and the opposing surfaces; and
   at least two optical sensing devices each positioned to generally face across one of the opposing surfaces and adapted to detect at least one object contacting the one surface, wherein the at least two optical sensing devices are operative to sense a portion of the optical signal emitted from the one surface at a location corresponding to the at least one object contacting the first surface.

2. A touch detection system comprising:
   a planar medium including a touch surface and an opposing surface, wherein an optical signal is totally internally reflected within the planar medium between at least the touch surface and the opposing surface;
   at least one optical sensing device having a field of view looking generally across the touch surface and operative to detect a portion of the optical signal emitted via the touch surface from the planar medium when at least one object is contacting the touch surface.

3. The system of claim 2, wherein each of the at least one optical sensing device is a camera device.

4. The system of claim 3, wherein each camera device comprises a complementary metal oxide semiconductor (CMOS) based camera sensor.

5. The system of claim 3, comprising at least two camera devices.

6. The system of claim 5, wherein images captured by the at least two camera devices are processed to produce object information data associated with the at least one object contacting the touch surface.

7. The system of claim 6, wherein the object information data includes position data of the at least one object, which is transmitted to a personal computer for use as input to one or more application programs executed by the personal computer.

8. The system of claim 5, wherein images captured by the at least two camera devices are processed to produce object information data associated with the at least one object hovering above the touch surface.

9. The system of claim 8, wherein the object information data includes position data of the at least one object, which is transmitted to a personal computer for use as input to one or more application programs executed by the personal computer.

10. The system of claim 5, wherein a first camera device of the at least two camera devices includes a first field of view and a second camera device of the at least two camera devices includes a second field of view that overlaps the first field of view.

11. The system of claim 2, wherein each of the at least one optical sensing device is a photodetector.

12. The system of claim 11, comprising at least two photodetectors.

13. The system of claim 12, wherein a first photodetector of the at least two photodetectors includes a first field of view and a second photodetector of the at least two photodetectors includes a second field of view that overlaps the first field of view.

14. The system of claim 12, wherein upon detection of a portion of the optical signal escaping from the touch surface, touch status information is transmitted to a personal computer for use as input to one or more application programs executed by the personal computer.

15. The system of claim 2, wherein the planar medium is adapted to be superimposed over a display screen.

16. The system of claim 2, wherein the planar medium is adapted to be integral with a display screen.

17. The system of claim 2, wherein the position of each optical sensing device with respect to the touch surface causes each optical sensing device to have a field of view looking only generally across the touch surface.

18. The system of claim 2, wherein the position of each optical sensing device with respect to the touch surface causes each optical sensing device to have a field of view also looking generally towards the touch surface.

19. The system of claim 2, wherein the planar medium comprises at least one edge facet depending from a respective edge of the touch surface.

20. The system of claim 19, wherein the at least one optical sensing device is positioned proximate to a respective edge facet and has a field of view that incorporates the respective edge of the touch surface.

21. The system of claim 20, wherein the at least one optical sensing device has a field of view that also incorporates the respective edge facet.

22. The system of claim 19, wherein the optical signal is totally internally reflected between at least the touch surface, the opposing surface and the at least one edge facet.

23. The system of claim 19, further comprising:
at least one optical source for transmitting, via the at least one edge facet, the optical signal to be totally internally reflected within the planar medium.

24. The system of claim 23, wherein the at least one optical source comprises a light emitting diode (LED).

25. The system of claim 24, wherein the light emitting diode (LED) comprises a viewing half angle of about 0-90 degrees.

26. The system of claim 23, wherein the at least one optical source comprises a laser.

27. The system of claim 19, wherein the at least one edge facet comprises a single circular shaped edge facet having an optically reflective surface.

28. The system of claim 19, wherein the at least one edge facet comprises at least one curved edge facet and at least one straight edge facet each having an optically reflective surface.

29. The system of claim 18, wherein the at least one edge facet comprises a first edge facet, a second edge facet, a third edge facet, and a fourth edge facet each having an optically reflective surface.

30. The system of claim 2, wherein the optical signal comprises an infrared signal.

31. The system of claim 2, wherein the optical signal comprises visible light.

32. The system of claim 2, wherein at least a portion of the optical signal is emitted from the touch surface when at least one finger is contacting the touch surface.

33. The system of claim 2, wherein at least a portion of the optical signal is emitted from the touch surface when at least one cylindrical pen-shaped object is contacting the touch surface.

34. The system of claim 2, wherein the optical signal comprises a modulated optical signal.

35. The system of claim 34, wherein the modulated signal comprises at least one of an intensity modulated signal, a frequency modulated signal and a phase modulated signal.

36. The system of claim 2, wherein the optical signal comprises an encoded optical signal.

37. The system of claim 36, wherein the encoded optical signal comprises a binary sequence.

38. The system of claim 37, wherein the binary sequence uses ON/OFF keying.

39. The system of claim 2, wherein the optical signal comprises a pseudo random binary sequence (PRBS) modulated optical signal.

40. The system of claim 2, further comprising at least one processor adapted to process pixel information corresponding to the at least one object contacting the touch surface.

41. The system of claim 40, further comprising a master controller coupled to the at least one processor, wherein the master controller is adapted to generate location coordinate information corresponding to the at least one object contacting the touch surface.

42. The system of claim 2, wherein the planar medium comprises an acrylic sheet.

43. The system of claim 42, wherein the acrylic sheet comprises at least one fire polished acrylic edge facet.

44. A method of detecting touch comprising:
causing an optical signal to be totally internally reflected within a planar medium between at least a touch surface and an opposing surface of the planar medium;
configuring at least one optical sensing device to have a field of view looking generally across the touch surface and to detect a portion of the optical signal emitted via the touch surface from the planar medium when at least one object is contacting the touch surface.

45. The method of claim 44, wherein each of the at least one optical sensing device is a camera device.

46. The method according to claim 45, further comprising:
processing pixel information corresponding to the at least one object contacting the touch surface.

47. The method of claim 45, wherein configuring at least one optical sensing device comprises configuring at least two camera devices to have a respective field of view looking generally across the touch surface and to detect a portion of the optical signal emitted via the touch surface from the planar medium when at least one object is contacting the touch surface.

48. The method of claim 47, further comprising:
processing images captured by the at least two camera devices to produce object information data associated with the at least one object hovering above the touch surface.

49. The method of claim 48, wherein the object information data includes position data of the at least one object, the method further comprising:
transmitting the position data to a personal computer for use as input to one or more application programs executed by the personal computer.

50. The method of claim 47, further comprising:
processing images captured by the at least two camera devices to produce object information data associated with the at least one object contacting the touch surface.

51. The method of claim 50, wherein the objection information data includes position data of the at least one object, the method further comprising:
transmitting the position data to a personal computer for use as input to one or more application programs executed by the personal computer.

52. The method according to claim 50, further comprising:
generating location coordinate information corresponding to the at least one object contacting the touch surface.

53. The method of claim 47, comprising configuring a first camera device of the at least two camera devices to have a first field of view and a second camera device of the at least two camera devices to have a second field of view that overlaps the first field of view.

54. The method of claim 44, wherein each of the at least one optical sensing device is a photodetector.

55. The method of claim 54, wherein configuring at least one optical sensing device comprises configuring at least two photodetectors to have a respective field of view looking generally across the touch surface and to detect a portion of the optical signal emitted via the touch surface from the planar medium when at least one object is contacting the touch surface.

56. The method of claim 55, wherein the field of view of the first photodetector overlaps the field of view of the second photodetector.

57. The method of claim 54, further comprising:
upon detection of a portion of the optical signal escaping from the touch surface, transmitting touch status information to a personal computer for use as input to one or more application programs executed by the personal computer.

58. The method of claim 44, wherein configuring at least one optical sensing device to have a field of view looking generally across the touch surface comprises configuring the at least one optical sensing device to have a field of view looking only generally across the touch surface.

59. The method of claim 44, wherein configuring at least one optical sensing device to have a field of view looking generally across the touch surface comprises configuring the at least one optical sensing device to have a field of view also looking generally towards the touch surface.

60. The method of claim 44, wherein the planar medium comprises at least one edge facet depending from a respective edge of the touch surface.

61. The method of claim 60, comprising positioning the at least one optical sensing device proximate to a respective edge facet to have a field of view that incorporates the respective edge of the touch surface.

62. The method of claim 61, comprising positioning the at least one optical sensing device to have a field of view that also incorporates the respective edge , facet.

63. The method of claim 60, comprising causing the optical signal to be totally internally reflected between at least the touch surface, the opposing surface and the at least one edge facet.

64. The method according to claim 60, wherein the at least one edge facet comprises a single circular shaped edge facet having an optically reflective surface.

65. The method according to claim 60, wherein the at least one edge facet comprises at least one curved edge facet and at least one straight edge facet each having an optically reflective surface.

66. The method according to claim 60, wherein the at least one edge facet comprises a first edge facet, a second edge facet, a third edge facet, and a fourth edge facet each comprising an optically reflective surface.

67. The method of claim 60, further comprising modulating the optical signal.

68. The method of claim 60, further comprising encoding the optical signal.

69. The method of claim 68, further comprising encoding a binary sequence into the optical signal.

70. The method of claim 69, wherein the the binary sequence uses ON/OFF keying.

71. The method of claim 44, further comprising pseudo random binary sequence (PRBS) modulating the optical signal.

72. The method of claim 44, further comprising at least one of:
intensity modulating the optical signal, frequency modulating the optical signal, phase modulating the optical signal.

73. A touch detection system comprising:
a planar medium including a touch surface and an opposing surface, wherein an optical signal is totally internally reflected within the planar medium between at least the touch surface and the opposing surface; and
at least one optical sensing device detecting a portion of the optical signal escaping from the touch surface when at least one object contacts the touch surface,
wherein the optical sensing device is located in proximity to the touch surface.

* * * * *